(12) United States Patent  (10) Patent No.: US 8,970,790 B2
Murakami  (45) Date of Patent: Mar. 3, 2015

(54) SWITCHING POWER SUPPLY DEVICE

(71) Applicant: Rohm Co., Ltd., Kyoto (JP)

(72) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/059,647

(22) Filed: Oct. 22, 2013

(65) Prior Publication Data

US 2014/0146238 A1 May 29, 2014

(30) Foreign Application Priority Data

Oct. 23, 2012 (JP) .................................. 2012-233778

(51) Int. Cl.
| H04N 5/63 | (2006.01) |
| H02M 3/157 | (2006.01) |
| H02M 3/158 | (2006.01) |
| H02M 3/156 | (2006.01) |
| H02M 1/00 | (2006.01) |

(52) U.S. Cl.
CPC ............... *H02M 3/1563* (2013.01); *H04N 5/63* (2013.01); *H02M 2001/0032* (2013.01)
USPC .............................. 348/730; 323/271; 323/283

(58) Field of Classification Search
USPC .................. 348/730; 323/268, 271, 282, 283; 361/52, 71, 78; 327/28, 276, 278, 392, 327/398, 574
See application file for complete search history.

(56) References Cited

U.S. PATENT DOCUMENTS

| 5,128,597 A * | 7/1992 | Kokubu ........................ 318/286 |
| 2010/0019749 A1* | 1/2010 | Katsuya et al. ............... 323/282 |
| 2012/0025797 A1* | 2/2012 | Futamura et al. ............. 323/283 |
| 2012/0133344 A1 | 5/2012 | Makoto |
| 2012/0212195 A1* | 8/2012 | Kushida et al. ............... 323/271 |

FOREIGN PATENT DOCUMENTS

JP 2012-115047 6/2012

* cited by examiner

*Primary Examiner* — Victor Kostak
(74) *Attorney, Agent, or Firm* — Fish & Richardson P.C.

(57) ABSTRACT

A switching power supply device has a switching controller adapted to generate an output voltage from an input voltage by turning on and off a switching device by a non-linear control method according to a comparison signal and a timer signal, a main comparator adapted to generate the comparison signal by comparing a feedback voltage based on the output voltage with a predetermined reference voltage, a timer adapted to output the timer signal as a one-shot pulse when a predetermined fixed period elapses after the switching device is turned from on to off or vice versa, and a reverse current detector adapted to detect a reverse current to the switching device to forcibly turn off the switching device. The timer and the reverse current detector are turned on at a pulse edge in the comparison signal, and are turned off on ending their respective operation.

19 Claims, 14 Drawing Sheets

SWITCHING POWER SUPPLY DEVICE

CROSS-REFERENCE TO RELATED APPLICATIONS

This application is based on the following Japanese Patent Applications, and the contents of which are hereby incorporated by reference:

(1) Japanese Patent Application No. 2012-233778 (the filing date: Oct. 23, 2012)

BACKGROUND OF THE INVENTION

1. Field of the Invention

The present invention relates to a switching power supply device that uses a non-linear control system and to an electronic apparatus (e.g., television) that uses the switching power supply device.

2. Description of Related Art

FIG. 14A to FIG. 14C are each a circuit block diagram and an operation waveform view that show a conventional example of a switching power supply device which uses a non-linear control method, of which FIG. 14A illustrates a switching power supply device that employs a hysteresis window system, FIG. 14B illustrates a switching power supply device that employs a bottom detection on-period fixing system, and FIG. 14C illustrates a switching power supply device that employs an upper detection off-period fixing system. In the meantime, any of the switching power supply devices illustrated in FIG. 14A to FIG. 14C is a voltage step-down type DC/DC converter that steps down an input voltage Vin to generate a desired output voltage Vout.

In the meantime, as an example of the conventional art related to the above description, there is JP-A-2012-115047.

The switching power supply device using a non-linear control method easily achieves high efficiency during a light load period compared with a switching power supply device using a linear control method (e.g., voltage mode control method and electric current mode control method). However, in recent years, as energy saving attracts more attention, power loss (power consumption during a standby period and the like) of an electronic apparatus during a light load period is becoming unable to be negligible, and also the switching power supply device using a non-linear control method is required to further increase efficiency during a light load period.

SUMMARY OF THE INVENTION

In light of the above problems found by the inventor of the present application, it is an object of the present invention to provide a switching power supply device capable of increasing efficiency during a light load period and an electronic apparatus that uses the switching power supply device.

To achieve the above object, a switching power supply device according to the present invention includes a structure which has: a switching control portion that generates an output voltage from an input voltage by performing on/off control of a switch device using a non-linear control method in accordance with a comparison signal and a timer signal; a main comparator that compares a feedback voltage corresponding to the output voltage and a predetermined reference voltage with each other to generate the comparison signal; a timer portion that performs a one-shot output of the timer signal at a time point when a predetermined fixed period elapses after the on/off of the switch device is switched; and a backward flow detection portion that detects a backward flow current for the switch device to forcibly turn off the switch device; wherein the timer portion and the backward flow detection portion are turned on at a time point when a pulse edge of the comparison signal occurs and turned off at a time point when operation of each of the timer portion and backward flow detection portion is completed.

In the meantime, other features, elements, steps, advantages and characteristics of the present invention will become more apparent from the following detailed description of preferred embodiments of the present invention with reference to the attached drawings.

DETAILED DESCRIPTION OF PREFERRED EMBODIMENTS

<First Embodiment>

Figure 1:
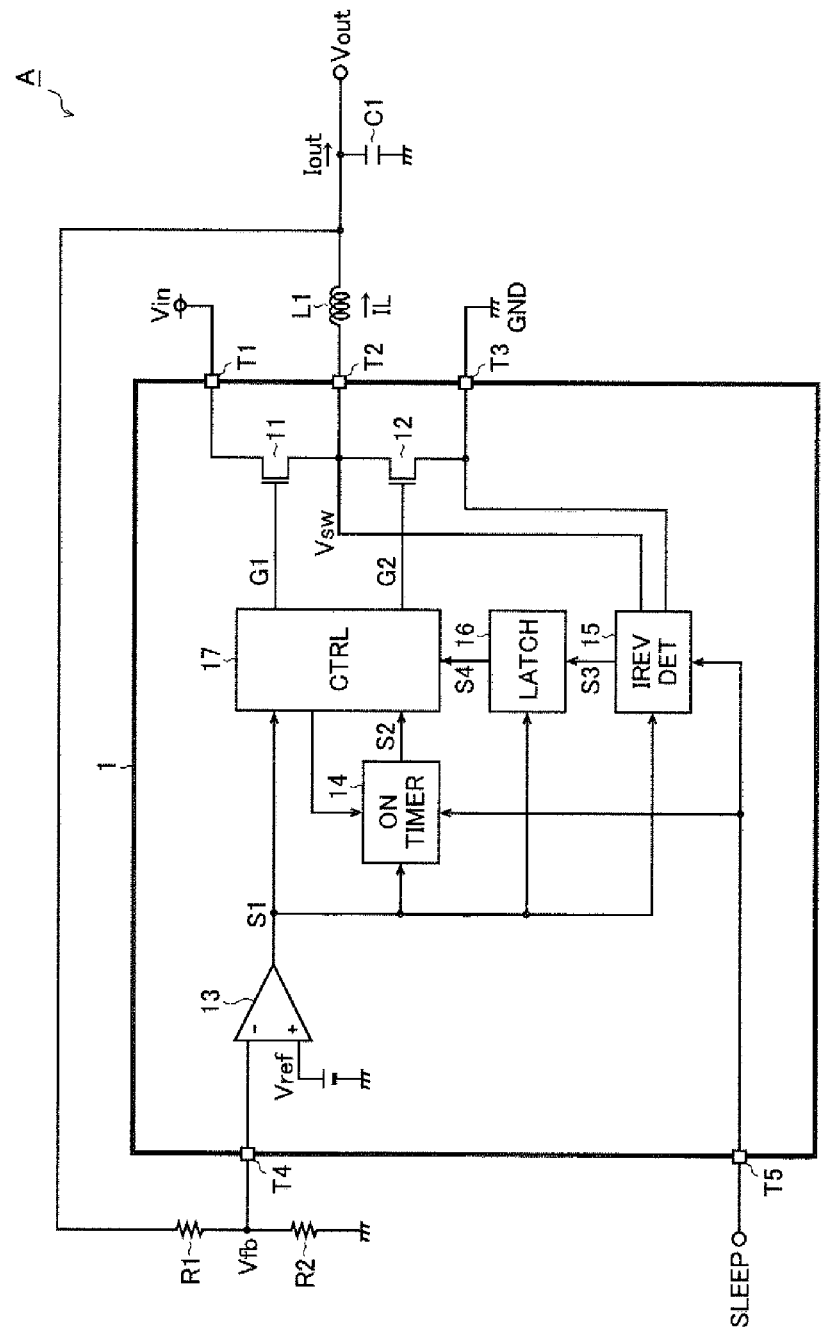
[FIG. 1] is a block diagram showing a first embodiment of a switching power supply device.

FIG. 1 is a block diagram showing a first embodiment of a switching power supply device. A switching power supply device A according to the first embodiment is a voltage step-down type DC/DC converter that generates an output voltage Vout from an input voltage Vin by means of a non-linear control method (here, bottom detection on-period fixing method). The switching power supply device A has: a semiconductor apparatus 1; and various discrete components (inductor L1, capacitor C1, resistors R1 and R2) externally connected to the semiconductor apparatus 1.

The semiconductor apparatus 1 has at least external terminals T1 to T5 to secure electric connection with outside. Outside the semiconductor apparatus 1, the external terminal (power supply terminal) T1 is connected to an application terminal for the input voltage V1. The external terminal (switch terminal) T2 is connected to a first terminal of the inductor L1. A second terminal of the inductor L1, a first terminal of the capacitor C1, and a first terminal of the resistor R1 are all connected to an application terminal for the output voltage Vout. A second terminal of the capacitor C1 is connected to a ground terminal. A second terminal of the resistor R1 and a first terminal of the resistor R2 both are connected to the external terminal (feedback terminal) T4 of the semiconductor apparatus 1. A second terminal of the resistor R2 is connected to the ground terminal. The resistors R1 and R2 function as a feedback voltage generation portion that outputs a feedback voltage Vfb, which is obtained by dividing the output voltage Vout, from a connection node between them. The external terminal (ground terminal) T3 of the semiconductor apparatus 1 is connected to the ground tell final. The external terminal (sleep terminal) T5 of the semiconductor apparatus 1 is connected to an application terminal for a sleep signal SLEEP.

The semiconductor apparatus 1 is a monolithic semiconductor integrated circuit apparatus (so-called switching power supply IC) that integrates: MOS field effect transistors 11 and 12 of N channel type; a main comparator 13; a timer portion 14; a backward flow detection portion 15; a latch portion 16; and a switching control portion 17.

The transistor 11 is a switch device (output transistor) that is connected between the external terminal T1 and the external terminal T2, and undergoes on/off control in accordance with a gate signal G1 input from the switching control portion 17. Describing a connection form, a drain of the transistor 11 is connected to the external terminal T1. A source of the transistor 11 is connected to the external terminal T2. A gate of the transistor 11 is connected to an application terminal for the gate signal G1.

The transistor 12 is a switch device (synchronization rectification transistor) that is connected between the external terminal T2 and the ground terminal, and undergoes on/off control in accordance with a gate signal G2 input from the switching control portion 17. Describing a connection form, a drain of the transistor 12 is connected to the external terminal T2. A source of the transistor 12 is connected to the ground terminal. A gate of the transistor 12 is connected to an application terminal for the gate signal G2.

The main comparator 13 compares the feedback voltage Vfb (divided voltage of the output voltage Vout) applied to the inverting input terminal (−) via the external terminal T4 and a predetermined reference voltage Vref applied to the non-inverting input terminal (+) with each other to generate a comparison signal S1. The comparison signal S1 goes to a low level when the feedback voltage Vfb is higher than the reference voltage Vref, and goes to a high level when the feedback voltage Vfb is lower than the reference voltage Vref. In the meantime, it is desirable that a constant voltage (band gap voltage or the like), which does not depend on the input voltage Vin and an ambient temperature, is used as the reference voltage Vref.

The timer portion 14 performs a one-shot output of a timer signal S2 at a time point when a predetermined on-period ton elapses after the transistor 11 is turned on. In the meantime, to know an on-timing of the transistor 11, it is useful to monitor an internal signal (e.g., a drive signal for a driver that generates the gate signal G1) of the switching control portion 17.

During an on-period of the transistor 12, the backward flow detection portion 15 compares a switch voltage Vsw appearing at the external terminal T2 and a ground voltage GND with each other to generate a zero-cross detection signal S3. The zero-cross detection signal S3 goes to a low level when the switch voltage Vsw is lower than the ground voltage GND, and goes to a high level when the switch voltage Vsw is higher than the ground voltage GND. In other words, the zero-cross signal S3 goes to the low level when an inductor current IL is flowing from the ground terminal to the inductor L1 via the transistor 12, and goes to the high level when the inductor current IL is flowing backward from the inductor L1 to the ground terminal via the transistor 12.

The latch portion 16 sets a skip signal S2 to a high level at a rising edge of the zero-cross detection signal S3, and resets the skip signal S2 to a low level at a rising edge of the comparison signal S1. In other words, the skip signal S2 is latched to the high level when a backward flow current for the transistor 12 is detected, and reset to the low level immediately before the transistor 11 is turned on next.

The switching control portion 17 includes an SR flip-flop and a driver, and performs on/off control (process of generating the gate signals G1 and G2) of the transistors 11 and 12 using the non-linear control method in accordance with the comparison signal S1 and the timer signal S2, thereby generating the output voltage Vout from the input voltage Vin. Besides, the switching control portion 17 includes a function (switching stop function) that forcibly turns off the transistor 12 during a period when the skip signal S4 is kept at the high level. By including such a function, it becomes possible to shut down the backward flow current for the transistor 12 to increase efficiency during a light load period.

Besides, the sleep signal SLEEP, which is used to switch an operation mode (sleep mode/nom-sleep mode) of the switching power supply apparatus A, is input in the semiconductor apparatus 1. For example, when the sleep signal SLEEP is at a low level, the switching power supply device A is brought to the non-sleep mode, while when the sleep signal SLEEP is at a high level, the switching power supply apparatus A is brought to the sleep mode (operation mode in which the power consumption of the switching power supply device A is reduced by performing power supply to only the smallest possible number of necessary circuit blocks).

especially, the sleep signal SLEEP is input in both timer portion 14 and backward flow detection portion 15; in the case where the switching power supply device A is kept in the non-sleep mode, the timer portion 14 and the backward flow detection portion 15 are kept in a normally turned-on state to prioritize increase in stability of output feedback control. On the other hand, in the case where the switching power supply device A is kept in the sleep mode, the timer portion 14 and the backward flow detection portion 15 undergo on/off control when necessary to prioritize increase in efficiency during the light load period.

Figure 2:
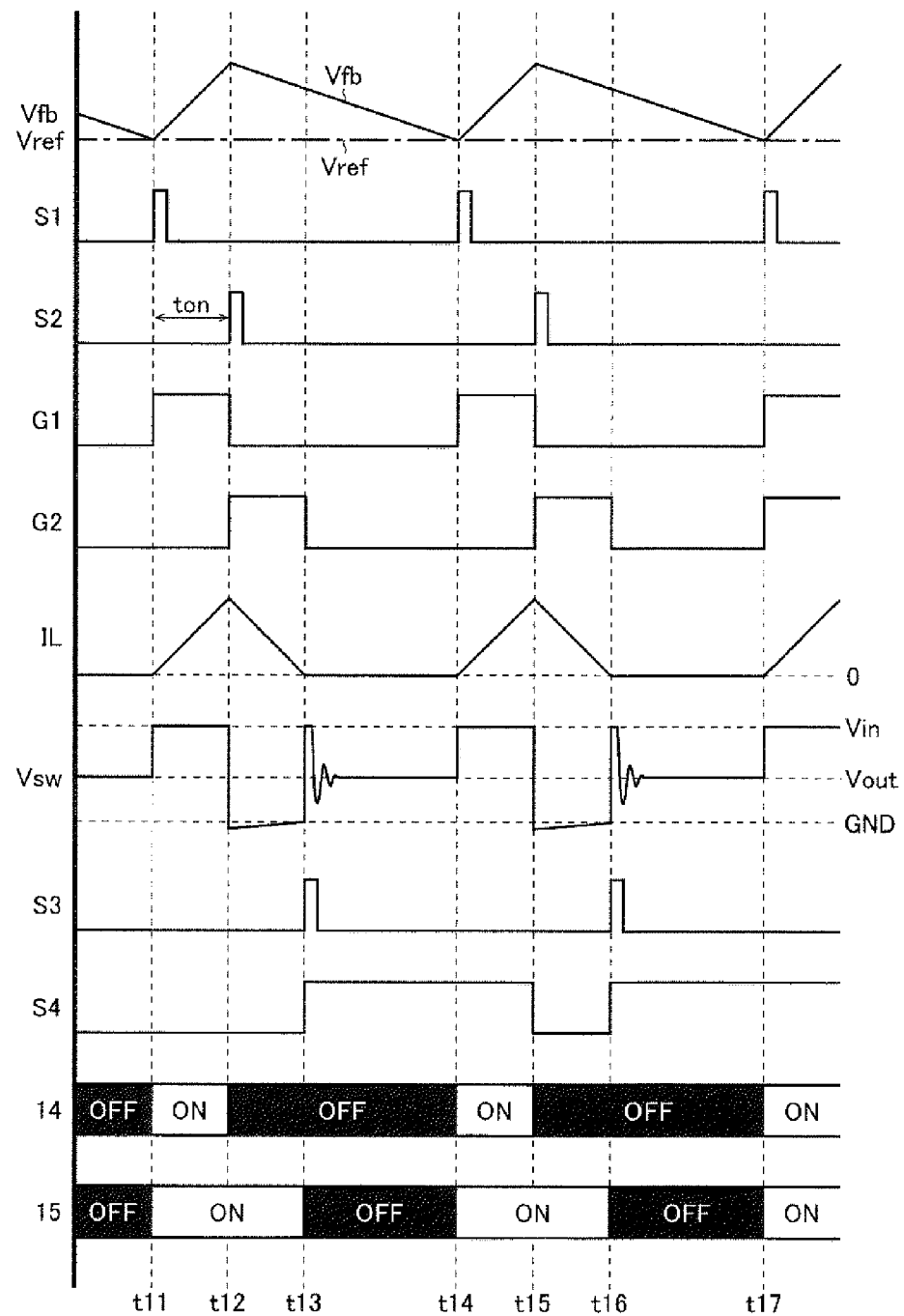
[FIG. 2] is a time chart showing a sleep operation of the first embodiment.

FIG. 2 is a time chart showing a sleep operation (operation in the case where the sleep signal SLEEP is at the high level) of the first embodiment, and illustrates, from top in order, the feedback voltage Vfb; the reference voltage Vref; the comparison signal S1; the timer signal S2; the gate signals G1 and G2; the inductor current IL; the switch voltage Vsw; the zero-cross detection signal S3; the skip signal S4; and on/off states of the timer portion 14 and backward flow detection portion 15.

At a time t11, if the feedback voltage Vfb becomes lower than the reference voltage Vref and the comparison signal S1 is raised to the high level, the gate signal G1 is raised to the high level and the transistor 11 is turned on. On the other hand, during a period of t11 to t12, the gate signal G2 is kept at the low level and the transistor 12 is kept in the off-state. As a result of this, during the period of t11 to t12, the switch voltage Vsw rises to substantially the input voltage Vin and the inductor current IL increases.

Besides, at the time t11, if the comparison signal S1 is raised to the high level, the rising edge is used as a trigger to turn on the timer portion and the backward flow detection portion 15. In the meantime; the transistor 11 is turned on at the time point when the comparison signal S1 is raised to the high level; accordingly, the timer portion 14 starts to count the on-period ton immediately after the turning-on of the transistor 11 at the time t11.

At the time t12, if the counting of the on-period ton by the timer portion 14 is completed and a trigger pulse is generated in the timer signal S2, the gate signal G1 is dropped to the low level and the gate signal G2 is raised to the high level. As a result of this, the transistor 11 is turned off and the transistor 12 is turned on. At this time, an induced electromotive force occurs in the inductor L1 to continue flowing the inductor current IL in the same direction as until now; accordingly, the inductor current IL flows from the ground terminal into the inductor L1 via the transistor 12. Therefore, the switch voltage Vsw declines to a negative voltage value that is lower than the ground voltage GND by a drop voltage across the transistor 12.

In the meantime, in FIG. 2, the on/off transition timings of the transistors 11 and 12 completely coincide with each other; however, from a viewpoint of preventing a through-current, a concurrent off-period of the transistors 11 and 12 may be set by giving a delay to the on/off transition timings of the transistors 11 and 12.

Besides, the timer portion 14 is turned off with no delay at the time point when the counting of the on-period ton is completed. Describing more specifically, after performing the one-shot output of the timer signal S2, the timer portion 14 shuts down a power supply route for itself. By performing such on/off control, it becomes possible to reduce power consumption of the timer portion 14 and achieve the efficiency increase during the light load period.

Here, during a heavy load period when an output current Iout flowing in a load is sufficiently large, energy stored in the inductor L1 is large; accordingly, the inductor current IL continues flowing to the load without becoming smaller than a zero value until a time t14 when the gate signal G1 is raised again to the high level, and the switch voltage Vsw is kept at the negative voltage value. On the other hand, during the period when the output current Iout flowing in the load is small, the energy stored in the inductor L1 is small; accordingly, at a time t13, the inductor current IL becomes smaller than the zero value and a backward flow current for the transistor 12 occurs, whereby polarity of the switch voltage Vsw is switched from negative to positive. In such a state, electric charges stored in the capacitor C1 are discarded to the ground terminal, which causes an efficiency decline during the light load period.

Because of this, a structure is employed, in which the switching power supply device A uses the backward flow detection portion 15 to generate the zero-cross detection signal S3 in accordance with presence/non-presence of a backward flow current (polarity reversal of the switch voltage Vsw) and forcibly turns off the transistor 12 during a high level period (times t13 to t14) of the skip signal S4 that is latched to the high level at a rising edge of the zero-cross detection signal S3. By employing such a structure, it is possible to quickly shut down the backward flow current for the transistor 12; accordingly, it becomes possible to solve the efficiency decline during the light load period.

In the meantime, the backward flow detection portion 15 is turned off with no delay at a time point when the backward flow detection operation is completed. Describing more specifically, the backward flow detection portion 15 raises the zero-cross detection signal S3 to the high level, thereafter, shuts down a power supply route for itself. By performing such on/off control, it becomes possible to reduce power consumption of the backward flow detection portion 15 and to achieve the efficiency increase during the light load period.

Also after a time t15, like in the above description, the switching stop process at the time of detecting the backward flow and the on/off control of the timer portion 14 and backward flow detection portion 15 are repeated. In other words, during a period when the output voltage Vout is larger than the reference voltage Vref, the switching power supply device A in the sleep mode stops the switching operation of the transistors 11 and 12 and turns off the circuit blocks other than the main comparator 13, thereby reducing the self-consumption of electric current as much as possible. After that, if a decline in the output voltage Vout is detected by the main comparator 13, the circuit blocks kept in the off-state restart to resume the switching operation of the transistors 11 and 12. By employing such a structure, it is possible to pull down an average electric-current consumption of the switching power supply device A; accordingly, it becomes possible to achieve the efficiency increase during the high load period.

In the meantime, in the above first embodiment, the timer portion 14 and the backward flow detection portion 15 are completely kept in the off-state until the comparison signal S1 rises to the high level; accordingly, it takes a relatively long time to restart various operations after the comparison signal S1 rises to the high level. On the other hand, at the time point when the comparison signal S1 rises to the high level, the switching control portion 17 turns on the transistor 11 with no delay. Because of this, in the above first embodiment, a restart delay of the timer portion 13 and backward flow detection portion 15 can become a problem.

For example, the timer portion 14 generally uses a constant current to charge the capacitor and counts a period as the on-period ton required to reach a predetermined threshold value after the charge start. At this time, the restart period of the timer portion 14 (period required for the constant current to reach a predetermined target value (constant value) after the timer portion 14 is turned on) must be sufficiently shorter than a target value of the on-period ton. However, the restart period of the timer portion 14 completely kept in the off-state does not have a large difference from the target value of the on-period ton; accordingly, the on-period ton of the transistor 11 becomes unnecessarily long, and there is a risk that an overshoot of the output voltage Vout occurs.

Besides, if the restart of the backward flow detection portion 15 delays, it becomes impossible to turn off the transistor 12 with no delay at the time point when the backward flow for the transistor 12 occurs; accordingly, the electric charges stored in the capacitor C1 are discarded to the ground terminal, which incurs the efficiency decline. Especially, in an application (application in which the output voltage Vout is low) that has a small duty, the period allowed for the restart of the backward flow detection portion 15 becomes short; accordingly, the above trouble easily occurs.

Figure 3:
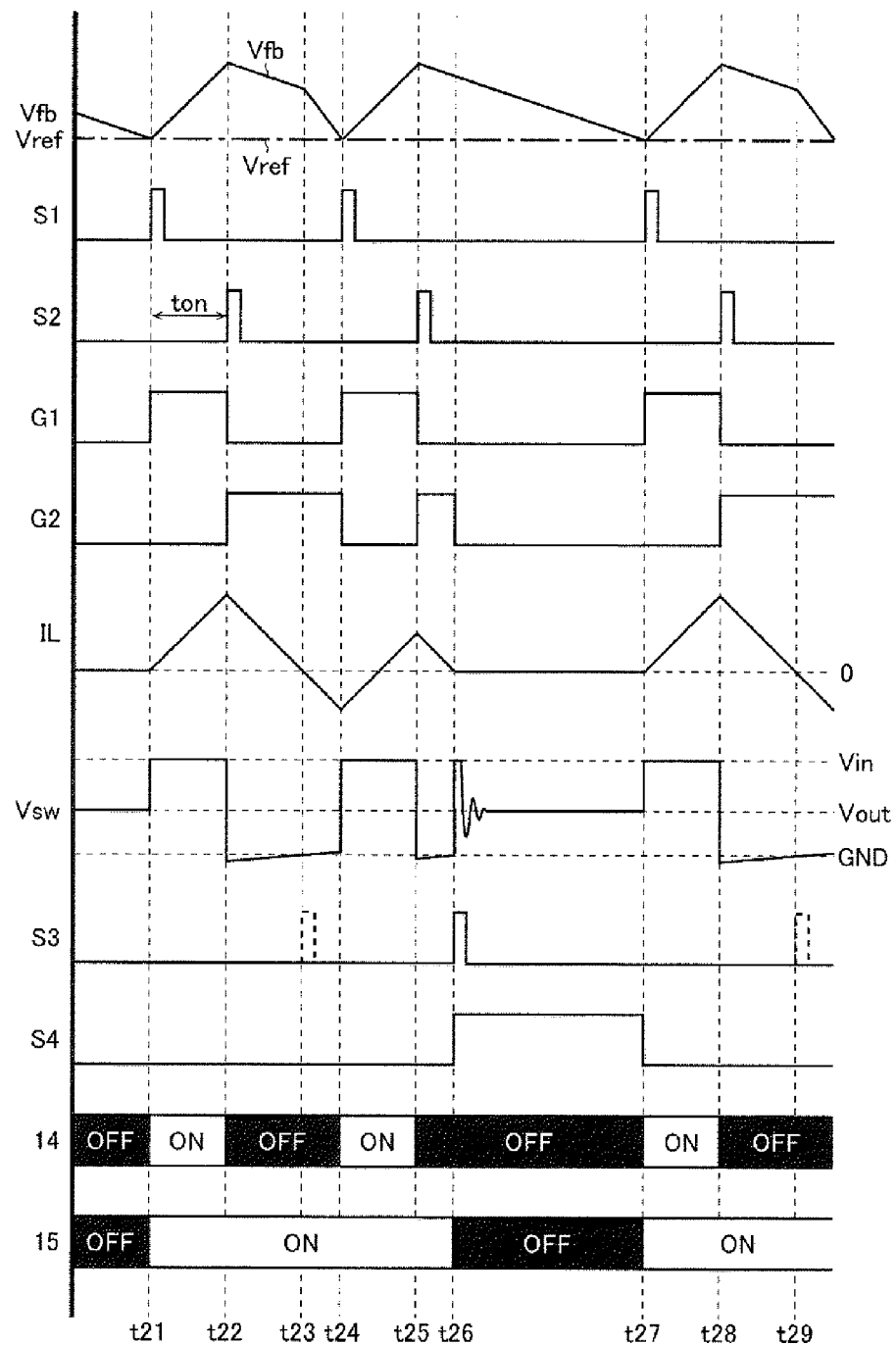
[FIG. 3] is a time chart showing trouble due to a restart delay of a backward flow detection portion 15.

FIG. 3 is a time chart showing the trouble due to the restart delay of the backward flow detection portion 15, and illustrates, from top in order, the feedback voltage Vfb; the reference voltage Vref; the comparison signal S1; the timer signal S2; the gate signals G1 and G2; the inductor current IL; the switch voltage Vsw; the zero-cross detection signal S3; the skip signal S4; and on/off states of the timer portion 14 and backward flow detection portion 15.

In essence, after the backward flow detection portion 15 is turned on at a time t21 when the comparison signal S1 is raised to the high level, the backward flow detection portion 15 must complete the restart by a time t23 when the backward flow current for the transistor 12 occurs. In a case where the restart of the backward flow detection portion 15 is not completed at the time t23, as shown in FIG. 3, it is impossible to raise the zero-cross detection signal S3 to the high level at the time t23; accordingly, the backward flow current continues flowing in the transistor 12.

Besides, after the time t23, in the state where the backward flow current is flowing in the transistor 12, the output voltage Vout sharply declines to become smaller than the reference voltage Vref; accordingly, the comparison signal S1 is raised to the high level at a timing (time t24) earlier than usual and the on-timing of the transistor 11 becomes earlier than usual.

In the meantime, the example of FIG. 3 shows the operation in which the restart of the backward flow detection portion 15 is completed by a time t26 until when a second backward flow current flows in the transistor 12 and the backward flow current for the transistor 12 is shut down at the time t26; however, in a case where the restart of the backward flow detection portion 15 is not completed at the time t26, the on-timing of the transistor 11 becomes earlier as described above.

As described above, if the restart delay of the backward flow detection portion 15 occurs, the switching stop function and sleep function during the light load period do not sufficiently work; accordingly, the efficiency decline is incurred.

Hereinafter, a switching power supply device, which is further improved considering that it takes a long time for the timer portion 14 and the backward flow detection portion 15 to restart, is described in detail using an example.

<Second Embodiment>

Figure 4:
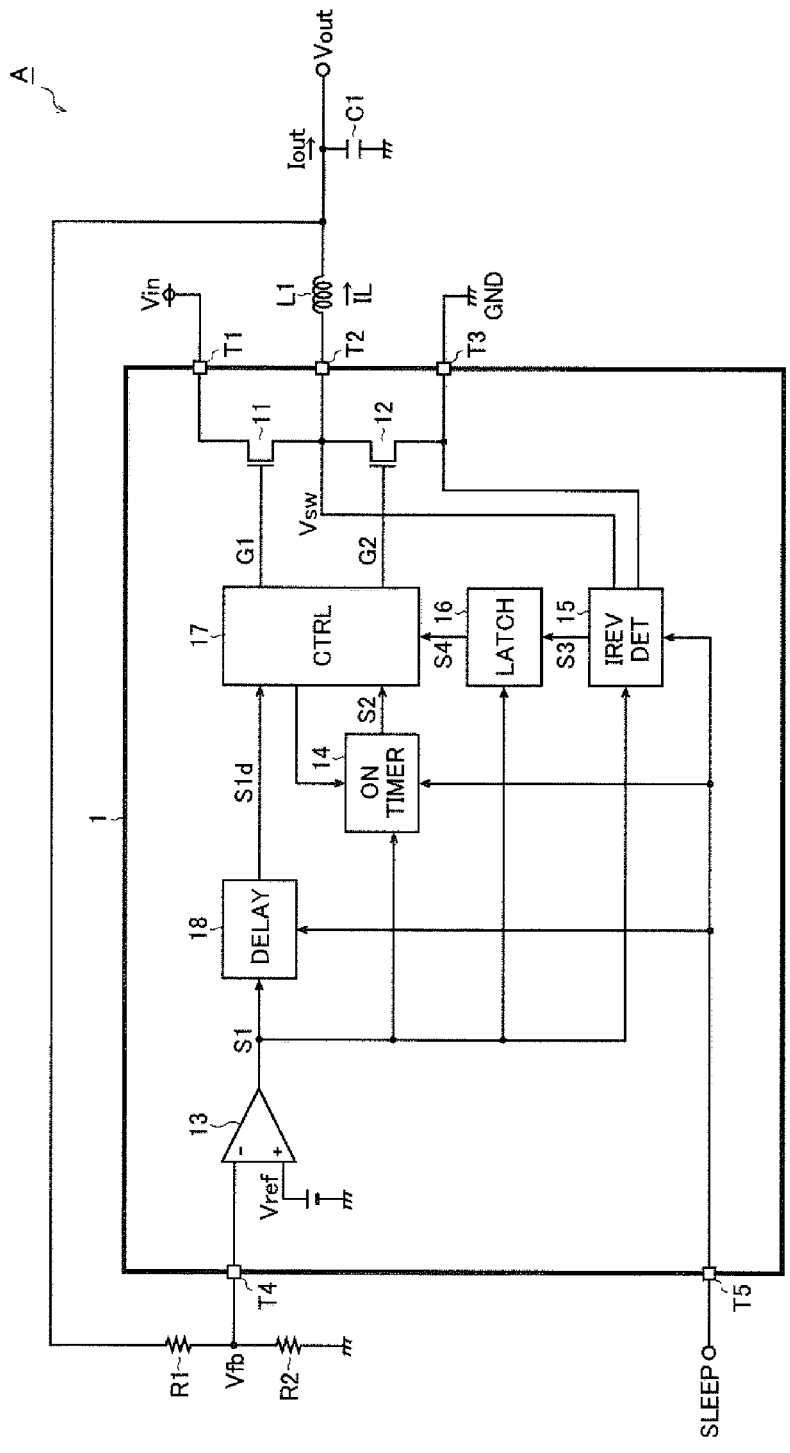
[FIG. 4] is a block diagram showing a second embodiment of a switching power supply device.

FIG. 4 is a block diagram showing a second embodiment of the switching power supply device. The second embodiment has substantially the same structure as the above first embodiment, and has a feature in that a delay portion 18 is added between the main comparator 13 and the switching control portion 17. Because of this, the same components as the first embodiment are indicated by the same reference numbers as in FIG. 1 to skip double description, and hereinafter, description is performed focusing on the feature portion of the second embodiment.

The delay portion 18 performs a one-shot output of a delay comparison signal S1d at a time point when a predetermined delay period td elapses after a rising edge of the comparison signal S1 occurs. In the meantime, the delay period td may be set at the restart period of the timer portion 14, for example.

The switching control portion 17 receives an input of the delay comparison signal S1d instead of the comparison signal S1, and performs the on/off control of the transistors 11 and 12 using the non-linear control method in accordance with the delay comparison signal S1d and the timer signal S2.

Figure 5:
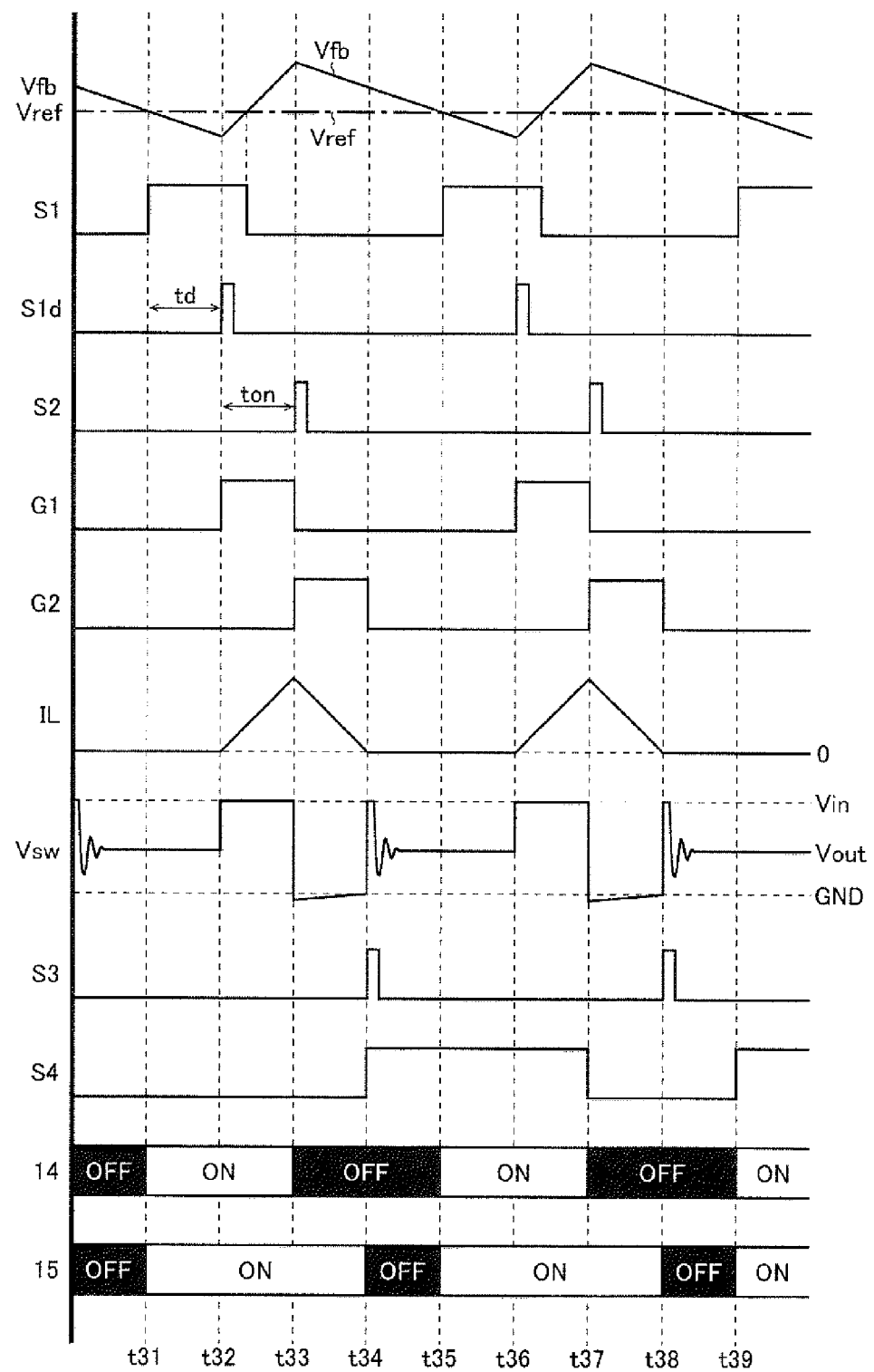
[FIG. 5] is a time chart showing a sleep operation of the second embodiment.

FIG. 5 is a time chart showing a sleep operation (operation in a case where the sleep signal SLEEP is at the high level) in the second embodiment, and illustrates, from top in order, the feedback voltage Vfb; the reference voltage Vref; the comparison signal S1; the delay comparison signal S1d; the timer signal S2; the gate signals G1 and G2; the inductor current IL; the switch voltage Vsw; the zero-cross detection signal S3; the skip signal S4; and on/off states of the timer portion 14 and backward flow detection portion 15.

At a time t31, if the feedback voltage Vfb becomes lower than the reference voltage Vref and the comparison signal S1 is raised to the high level, the delay portion 18 uses the rising edge as a trigger to start the counting of the delay period td.

Besides, at the time t31, the rising edge of the comparison signal S1 is used as a trigger to turn on the timer portion 14 and the backward flow detection portion 15. In the meantime, at the time t31, the transistors 11 and 12 both are still kept in the off-state and the timer portion 14 does not start the counting (operation of charging the capacitor using the constant current) of the on-period ton.

At a time t32, if the delay portion 18 completes the counting of the delay period td and a trigger pulse is generated in the delay comparison signal S1d, the gate signal G1 is raised to the high level to turn on the transistor 11. On the other hand, during a period of t32 to t33, the gate signal G2 is kept at the low level and the transistor 12 is still kept in the off-state. As a result of this, during the period of t32 to t33, the switch voltage Vsw rises to substantially the input voltage Vin and the inductor current IL increases.

Besides, at the time t32, the transistor 11 is turned on, thereafter, the timer portion 14 starts the counting of the on-period ton. As described above, according to the switching power supply device A in the second embodiment, it is sufficient if the restart of the timer portion 14 is completed not by the time t31 when the comparison signal S1 is raised to the high level but by the time t32 when the trigger pulse is generated in the delay comparison signal S1d. Therefore, it is possible to add a margin of the delay period td to the restart period of the timer portion 14 compared with the first embodiment; accordingly, it becomes possible to solve the restart delay of the timer portion 14 and to prevent the overshoot of the output voltage Vout.

In the meantime, because the on-timing of the transistor 11 is delayed by the delay period td, during the period of t31 to t32, the output voltage Vout (and the feedback voltage Vfb) declines to become lower than a target value. However, the output current Iout flowing in the load is small during the light load period; accordingly, also the decline in the output voltage Vout becomes small. For example, in a case where the delay period td is 1 µs; the output current Iout is 1 mA; and the capacitor C1 has a capacitance value of 22 µF, the output voltage Vout declines by only 45 µV (=Iout×td/C1). Accordingly, even in the case where the structure in the second embodiment is employed, it is conceivable that trouble with the load is unlikely to occur.

At the time t33, if the timer portion 14 completes the counting of the on-period ton and a trigger pulse is generated in the timer signal S2, the gate signal G1 is dropped to the low level and the gate signal G2 is raised to the high level. As a result of this, the transistor 11 is turned off and the transistor 12 is turned on. At this time, an induced electromotive force occurs in the inductor L1 to continue flowing the inductor current IL in the same direction as until now; accordingly, the inductor current IL flows from the ground terminal into the inductor L1 via the transistor 12. Therefore, the switch voltage Vsw declines to the negative voltage value that is lower than the ground voltage GND by the drop voltage across the transistor 12. In the meantime, like in the first embodiment, the timer portion 14 is turned off with no delay at the time point when the counting of the on-period ton is completed.

At a time t34, if the inductor current IL becomes lower than the zero value; a backward flow current for the transistor 12 occurs and the polarity of the switch voltage Vsw is switched from negative to positive, the zero-cross detection signal S3 is raised to the high level, and further, the skip signal S4 is raised to the high level. As a result of this, the transistor 12 is forcibly turned off. By employing such a structure, it is possible to quickly shut down the backward flow current for the transistor 12; accordingly, it becomes possible to solve the efficiency decline during the light load period. Here, according to the switching power supply device A in the second embodiment, it is possible to add a margin of the delay period td to the restart period of the backward flow detection portion 15 compared with the first embodiment; accordingly, it becomes possible to solve the restart delay of the backward flow detection portion 15 and to quickly shut down the backward flow current for the transistor 12. In the meantime, like in the first embodiment, the backward flow detection portion 15 is turned off with no delay at the time point when the backward flow detection operation is completed.

Also after a time t35, like in the above description, the switching stop process at the time of detecting the backward flow and the on/off control of the timer portion 14 and backward flow detection portion 15 are repeated.

As described above, in the switching power supply device A according to the second embodiment, at the time point when the feedback voltage Vfb becomes lower than the reference voltage Vref, first, only the restart of the timer portion 14 and backward flow detection portion 15 is performed, and further at the time point when the predetermined delay period td elapses, the switching operation of the transistors 11 and 12 is resumed. By employing such a structure, it becomes possible to solve the restart delay of the timer portion 14 and backward flow detection portion 15 and to achieve the efficiency increase during the light load period.

In the meantime, in the case where the sleep signal SLEEP is input in the delay portion 18 and the switching power supply device A is kept in the sleep mode, the above one-shot output of the delay comparison signal S1d is performed. On the other hand, in the case where the switching power supply device A is kept in the non-sleep mode, a through-output of the comparison signal S1 as the delay comparison signal S1d is performed. In other words, in the case where the switching power supply device A is kept in the non-sleep mode, the comparison signal S1 bypasses the delay portion 18 to be directly input into the switching control portion 17.

By employing such a structure, in the case where the output current tout for the load becomes large and the switching power supply device A is brought to the non-sleep mode, the above delay period td becomes 0; accordingly, it becomes possible to curb a decline in the output voltage Vout. In the meantime, in the case where the switching power supply device A is kept in the non-sleep mode, the timer portion 14 and the backward flow detection portion 15 both are kept in the normally turned-on state; accordingly, their restart delay does not become a problem.

Figure 6:
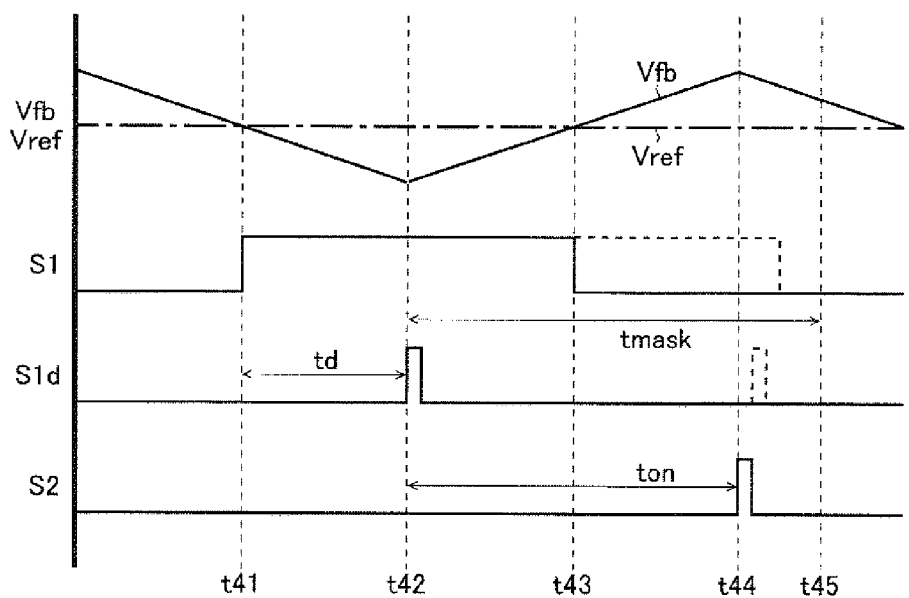
[FIG. 6] is a time chart showing a mask operation of a comparison signal S1.

FIG. 6 is a time chart showing a mask operation of the comparison signal S1 in the delay portion 18, and illustrates, from top in order, the feedback voltage Vfb; the reference voltage Vref; the comparison signal S1; the delay comparison signal S1d; and the timer signal S2.

As described above, in the switching power supply device A according to the second embodiment, because the on-timing of the transistor 11 is delayed by the delay period td, during a period of t41 to t43, the feedback voltage Vfb becomes lower than the reference voltage Vref and the comparison signal S1 is kept at the high level. Here, if the comparison signal S1 drops to the low level by a time t44 when the counting of the on-period ton is completed, a problem does not occur; however, in a case where the comparison signal S1 is kept at the high level even after the time t44 because of an internal delay of the main comparator 13 and the like, there is a risk that the delay portion 18 receiving the input of the comparison signal S1 generates an unexpected trigger pulse in the delay comparison signal S1d and the transistor 11 is turned on unnecessarily.

Because of this, in the switching power supply device A according to the second embodiment, a structure is employed, in which after performing the one-shot output of the delay comparison signal S1d, the delay portion 18 neglects the comparison signal S1 for a predetermined mask period tmask. By employing such a structure, the transistor 11 is prevented from unnecessarily being turned on a plurality of times; accordingly, it becomes possible to achieve the efficiency increase during the light load period.

Figure 7:
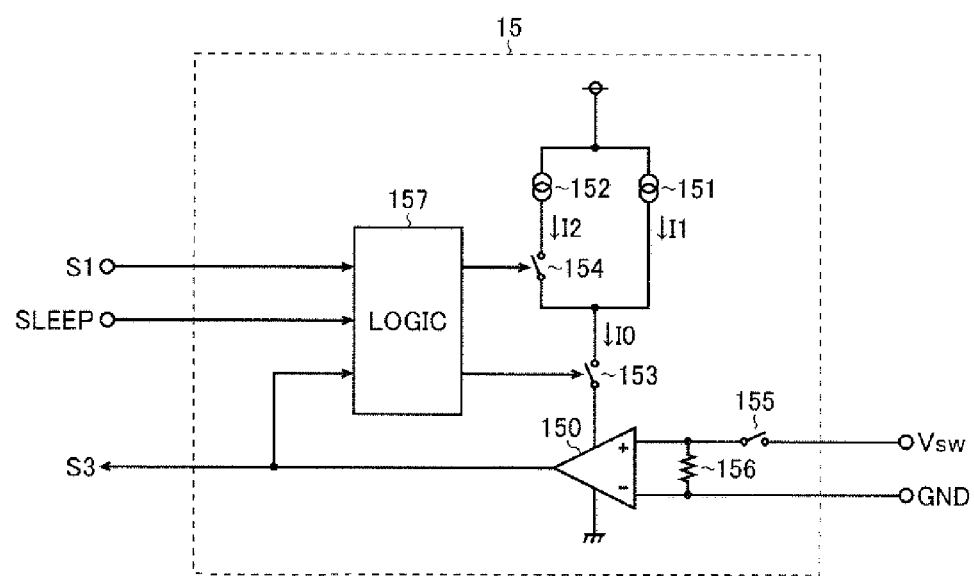
[FIG. 7] is a block diagram showing a structural example of the backward flow detection portion 15.

FIG. 7 is a block diagram showing a structural example of the backward flow detection portion 15. The backward flow detection portion 15 in the present structural example includes: a comparator 150; electric current sources 151 and 152; switches 153 to 155; a resistor 156; and a logic portion 157.

A non-inverting input terminal (+) of the comparator 150 is connected to a first terminal of the switch 155 and to a first terminal of the resistor 156. A second terminal of the switch 155 is connected to an application terminal (external terminal T2) for the switch voltage Vsw. An inverting input terminal (−) of the comparator 150 and a second terminal of the resistor 156 both are connected to an application terminal (external terminal T3) for the ground voltage GND.

In the meantime, the switch 155 is turned on/off in synchronization with the transistor 12. Accordingly, when the transistor 12 is kept in the on-state, the non-inverting input terminal (+) of the comparator 150 is electrically connected to the application terminal for the switch voltage Vsw via the switch 155, while when the transistor 12 is kept in the off-state, the non-inverting input terminal (+) of the comparator 150 is electrically pulled down to the application terminal for the ground voltage GND via the resistor 156.

First terminals of the electric current sources 151 and 152 both are connected to the power supply line. A second terminal (output terminal for a drive current I1) of the electric current source 151 is connected to a first terminal of the switch 153. A second terminal (output terminal for drive current I2) of the electric current source 152 is connected to a first terminal of the switch 154. A second terminal of the electric current source 154 is connected to the first terminal of the switch 153. A second terminal of the switch 153 is connected to a power supply terminal of the comparator 150.

The logic portion 157 receives inputs of the comparison signal S1, zero-cross detection signal S3 and sleep signal SLEEP to perform on/off control of the switches 153 and 154. Describing more specifically, in the ease where the sleep signal SLEEP is at the low level, the logic portion 157 puts the switch 153 into a normally turned-on state and the switch 154 into a normally turned-off state irrespective of the comparison signal S1 and the zero-cross detection signal S3. In other words, in the case where the switching power supply device A is kept in the non-sleep mode, as a drive current I0 for the comparator 150, the drive current I1 only is normally supplied.

On the other hand, in the case where the sleep signal SLEEP is at the high level, the logic portion 157 puts the switch 154 into a normally turned-on state, uses a rising edge of the comparison signal S1 as a trigger to turn on the switch 153, and uses a rising edge of the zero-cross detection signal S3 as a trigger to turn off the switch 153. In other words, in the case where the switching power supply device A is kept in the sleep mode, as the drive current I0 for the comparator 150, a sum current of the drive currents I1 and I2 is intermittently supplied. As described above, the backward flow detection portion 15 in the present structural example operates on the drive current I0 (=I1+I2) larger than usual in the sleep mode and operates on the usual drive current I0 (=I1) in the non-sleep mode; accordingly, it becomes possible to shorten the restart period of the backward flow detection portion 15 in the sleep mode.

<Third Embodiment>

Figure 8:
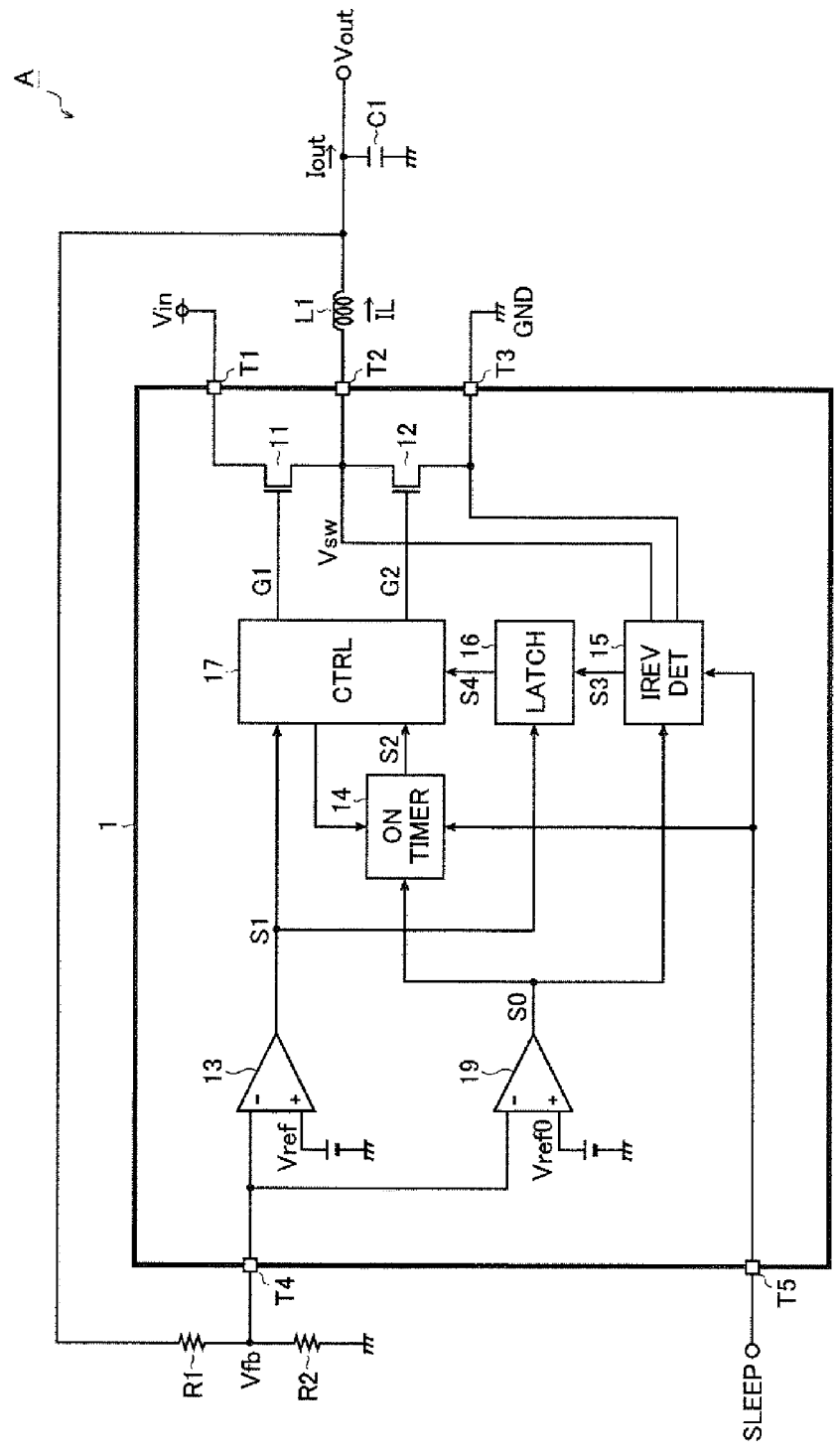
[FIG. 8] is a block diagram showing a third embodiment of a switching power supply device.

FIG. 8 is a block diagram showing a third embodiment of the switching power supply device. The third embodiment has substantially the same structure as the above first embodiment, and has a feature in that a startup comparator 19 is added in parallel with the main comparator 13. Because of this, the same components as the first embodiment are indicated by the same reference numbers as in FIG. 1 to skip double description, and hereinafter, description is performed focusing on the feature portion of the third embodiment. The startup comparator 19 compares the feedback voltage Vfb applied to the inverting input terminal (−) and a threshold value voltage Vref0 (>Vref) applied to the non-inverting input terminal (+) with each other to generate a startup signal S0. The startup signal S0 goes to a low level when the feedback voltage Vfb is higher than the threshold value voltage Vref0, and goes to a high level when the feedback voltage Vfb is lower than the threshold value voltage Vref0. The threshold value voltage Vref0 may be set such that a rising edge of the comparison signal S1 occurs at a time point when a predetermined preparation period tpre elapses after a rising edge of the startup signal S0 occurs. In the meantime, the preparation period tpre may be set at the restart period of the timer portion 14, for example. Besides, it is desirable that a constant voltage (band gap voltage or the like), which does not depend on the input voltage Vin and the ambient temperature like the reference voltage Vref, is used as the reference voltage Vref.

The timer portion 14 and the backward flow detection portion 15 receive an input of the startup signal S0 instead of the comparison signal S1, and are turned on at a time point when the rising edge of the startup signal S0 occurs before the rising edge of the comparison signal S1 occurs.

Figure 9:
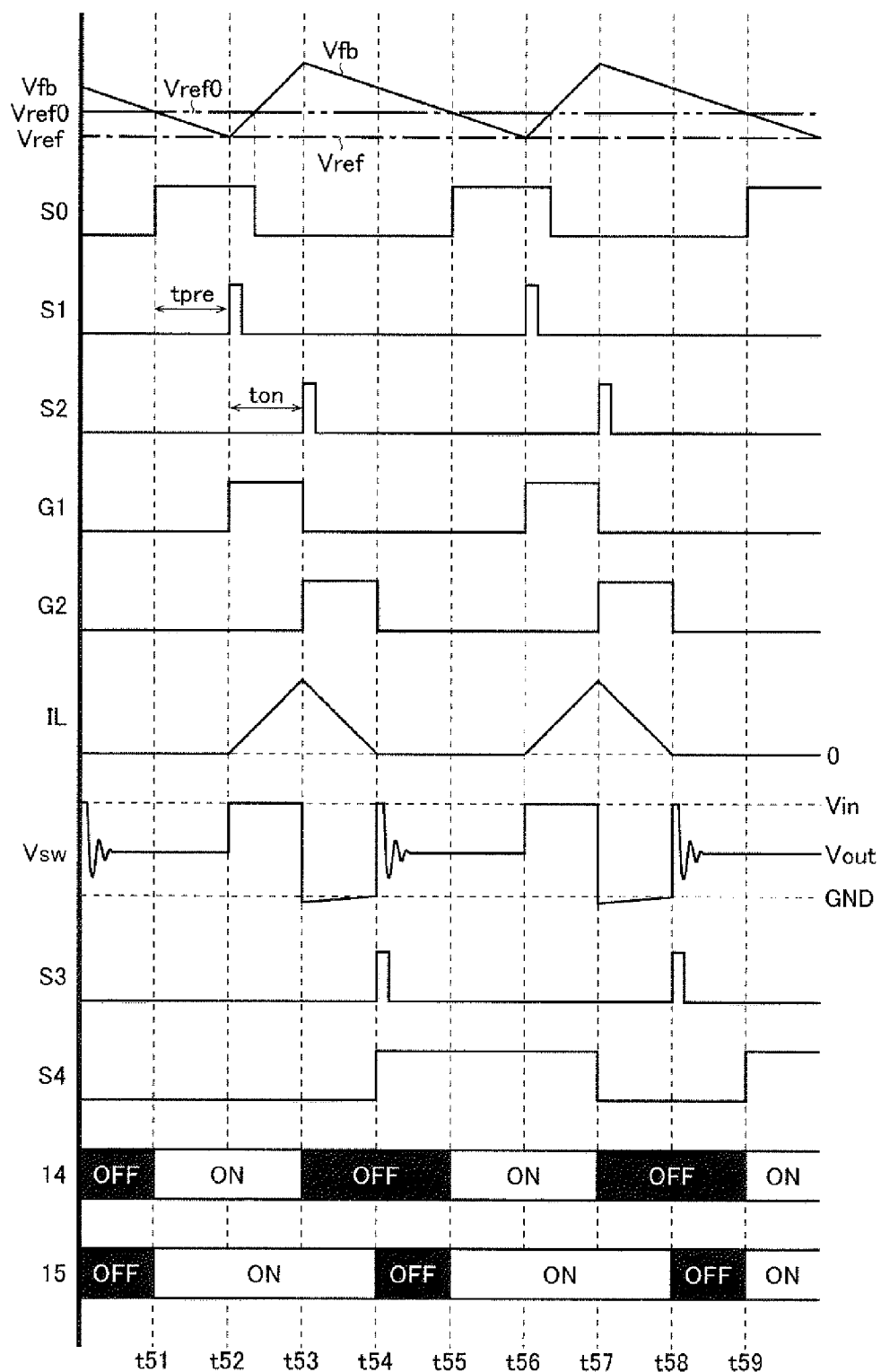
[FIG. 9] is a time chart showing a sleep operation of the third embodiment.

FIG. 9 is a time chart showing a sleep operation (operation in the case where the sleep signal SLEEP is at the high level) of the third embodiment, and illustrates, from top in order, the feedback voltage Vfb; the threshold value voltage Vref0; the reference voltage Vref; the startup signal S0; the comparison signal S1; the timer signal S2; the gate signals G1 and G2; the inductor current IL; the switch voltage Vsw; the zero-cross detection signal S3; the skip signal S4; and on/off states of the timer portion 14 and backward flow detection portion 15.

At a time t51, if the feedback voltage Vfb becomes lower than the threshold value voltage Vref0 and the startup signal S0 is raised to the high level, the rising edge is used as a trigger to turn on the timer portion 14 and the backward flow detection portion 15. In the meantime, at the time t51, the transistors 11 and 12 both are still kept in the off-state, and the timer portion 14 does not start the operation of counting (operation of charging the capacitor using the constant current) the on-period ton.

At a time t52, if the feedback voltage Vfb becomes lower than the reference voltage Vref and the comparison signal S1 is raised to the high level, the gate signal G1 is raised to the high level and the transistor 11 is turned on. On the other hand, during a period of times t52 to t53, the gate signal G2 is kept at the low level and the transistor 12 is still kept in the off-state. As a result of this, during the period of times t52 to t53, the switch voltage Vsw rises to substantially the input voltage Vin and the inductor current IL increases.

Besides, at the time t52, the transistor 11 is turned on, thereafter, the tinier portion 14 starts the counting of the on-period ton. As described above, according to the switching power supply device A in the third embodiment, a pre-restart of the timer portion 14 is started at the time t51 that is earlier than the time t52 when to start the counting of the on-period ton by the preparation period tpre. Therefore, it is possible to add a margin of the preparation period tpre to the restart period of the timer portion 14 compared with the first embodiment; accordingly, it becomes possible to solve the restart delay of the timer portion 14 and to prevent the overshoot of the output voltage Vout.

At the time t53, if the timer portion 14 completes the counting of the on-period ton and a trigger pulse is generated in the timer signal S2, the gate signal G1 is dropped to the low level and the gate signal G2 is raised to the high level. As a result of this, the transistor 11 is turned off and the transistor 12 is turned on. At this time, an induced electromotive force occurs in the inductor L1 to continue flowing the inductor current IL in the same direction as until now; accordingly, the inductor current IL flows from the ground terminal into the inductor L1 via the transistor 12. Therefore, the switch voltage Vsw declines to a negative voltage value that is lower than the ground voltage GND by a drop voltage across the transistor 12. In the meantime, like in the first embodiment, the timer portion 14 is turned off with no delay at the time point when the counting of the on-period ton is completed.

At a time t54, if the inductor current IL becomes lower than the zero value; a backward flow current for the transistor 12 occurs and the polarity of the switch voltage Vsw is switched from negative to positive, the zero-cross detection signal S3 is raised to the high level, and further, the skip signal S4 is raised to the high level. As a result of this, the transistor 12 is forcibly turned off. By employing such a structure, it is possible to quickly shut down the backward flow current for the transistor 12; accordingly, it becomes possible to solve the efficiency decline during the light load period. Here, according to the switching power supply device A in the third embodiment, it is possible to add a margin of the preparation period tpre to the restart period of the backward flow detection portion 15 compared with the first embodiment; accordingly, it becomes possible to solve the restart delay of the backward flow detection portion 15 and to quickly shut down the backward flow current for the transistor 12. In the meantime, like in the first embodiment, the backward flow detection portion 15 is turned off with no delay at the time point when the backward flow detection operation is completed.

Also after a time t55, like in the above description, the switching stop process at the time of detecting the backward flow and the on/off control of the timer portion 14 and backward flow detection portion 15 are repeated.

As described above, in the switching power supply device A according to the third embodiment, at the time point when the feedback voltage Vfb becomes lower than the threshold value voltage Vref0 (>Vref), first, only the restart of the timer portion 14 and backward flow detection portion 15 is performed, and further at the time point when the feedback voltage Vfb declines to become lower than the reference voltage Vref, the switching operation of the transistors 11 and 12 is resumed. By employing such a structure, it becomes possible to solve the restart delay of the timer portion 14 and backward flow detection portion 15 and to achieve the efficiency increase during the light load period. Besides, according to the switching power supply device A in the third embodiment, unlike the second embodiment, the on-timing of the transistor 11 is not delayed; accordingly, the decline in the output voltage Vout is not incurred.

<Fourth Embodiment>

Figure 10:
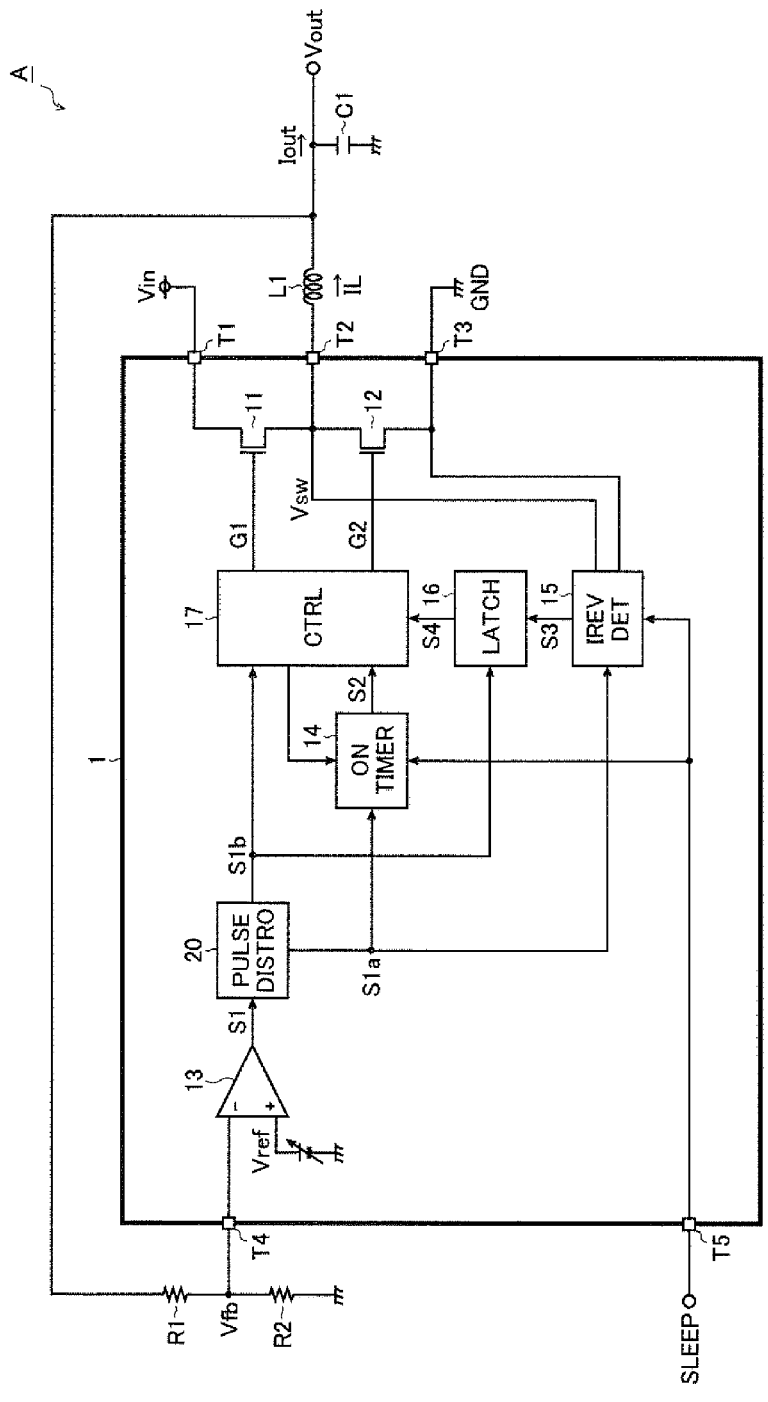
[FIG. 10] is a block diagram showing a fourth embodiment of a switching power supply device.

FIG. 10 is a block diagram showing a fourth embodiment of the switching power supply device. The fourth embodiment has substantially the same structure as the above first embodiment, and has a feature in that the reference voltage Vref is a variable value and a pulse distribution portion 20 is added between the main comparator 13 and the switching control portion 17. Because of this, the same components as the first embodiment are indicated by the same reference numbers as in FIG. 1 to skip double description, and hereinafter, description is performed focusing on the feature portion of the fourth embodiment.

The pulse distribution portion 20 distributes two pulses (described in detail later), which occur in the comparison signal S1 thanks to variable control of the reference voltage Vref, to a first comparison signal S1a and a second comparison signal S1b.

The timer portion 14 and the backward flow detection portion 15 receive an input of the first comparison signal S1a instead of the comparison signal S1, and are turned on at a time point when a rising edge of the first comparison signal S1a occurs before a rising edge of the second comparison signal S1b occurs.

The switching control portion 17 receives an input of the second comparison signal S1b instead of the comparison signal S1, and performs the on/off control of the transistors 11 and 12 using the non-linear control method in accordance with the second comparison signal S1b and the timer signal S2.

Figure 11:
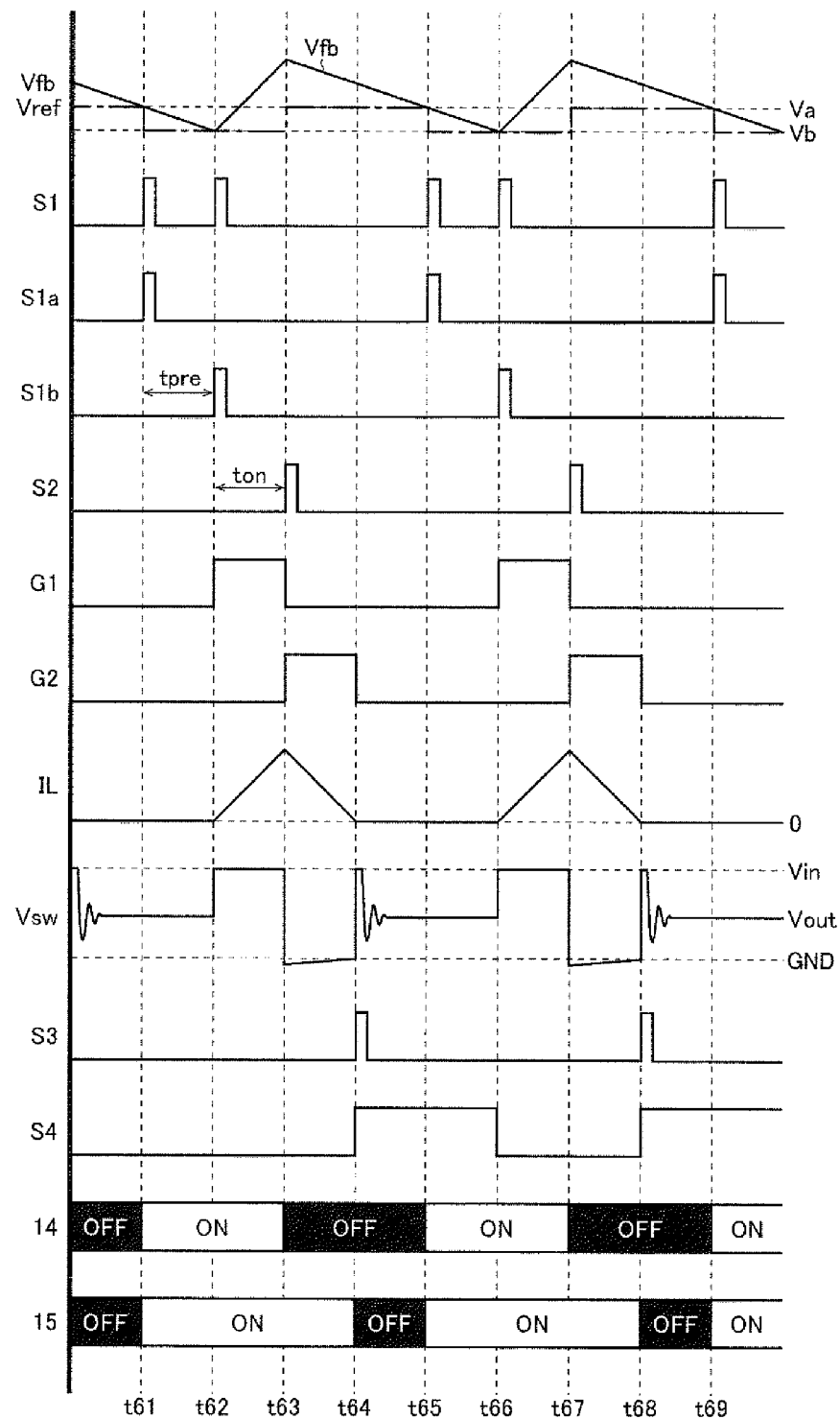
[FIG. 11] is a time chart showing a sleep operation of the fourth embodiment.

FIG. 11 is a time chart showing a sleep operation (operation in the case where the sleep signal SLEEP is at the high level) of the fourth embodiment, and illustrates, from top in order, the feedback voltage Vfb; the reference voltage Vref; the comparison signal S1; the first comparison signal S1a; the second comparison signal S1b; the timer signal S2; the gate signals G1 and G2; the inductor current IL; the switch voltage Vsw; the zero-cross detection signal S3; the skip signal S4; and on/off states of the timer portion 14 and backward flow detection portion 15.

The reference voltage Vref is a variable value that is switched to voltages Va and Vb (where Va>Vb) in two steps. The voltage Va is a voltage to decide the restart timing of the timer portion 14 and backward flow detection portion 15, and may be set such that the rising edge of the second comparison signal S1b occurs at a time point when the predetermined preparation period tpre elapses after the rising edge of the first comparison signal S1a occurs. In the meantime, the preparation period tpre may be set at the restart period of the timer portion 14, for example. Besides, the voltage Vb is a voltage to decide the target value of the output voltage Vout.

The reference voltage Vref is triggered by the rising edge of the first comparison signal S1a to be pulled down from the voltage Va to the voltage Vb, on the other hand, is triggered by the rising edge of the timer signal S2 to be pulled up from the voltage Vb to the voltage Va. However, the variable timing of the reference voltage Vref is not limited to this, but for example, the rising edge of the second comparison signal S1b or the rising edge of the zero-cross detection signal S3 may be used as a trigger to pull up the reference voltage Vref from the voltage Vb to the voltage Va, or a structure may be employed, in which the reference voltage Vref may be alternately switched between the voltage Va and the voltage Vb at every rising edge of the comparison signal S1.

At a time t61, if the feedback voltage Vfb becomes lower than the reference voltage Vref (=Va) and the first pulse occurring in the comparison signal S1 is distributed as the first comparison signal S1a, the rising edge of the first comparison signal S1a is used as a trigger to turn on the timer portion 14 and the backward flow detection portion 15. In the meantime, at the time t61, the transistors 11 and 12 both are still kept in the off-state, and the timer portion 14 does not start the operation of counting (operation of charging the capacitor using the constant current) the on-period ton.

At a time t62, if the feedback voltage Vfb becomes lower than the reference voltage Vref (=Vb) and the second pulse occurring in the comparison signal S1 is distributed as the second comparison signal S1b, the gate signal G1 is raised to the high level and the transistor 11 is turned on. On the other hand, during a period of times t62 to t63, the gate signal G2 is kept at the low level and the transistor 12 is still kept in the off-state. As a result of this, during the period of times t62 to t63, the switch voltage Vsw rises to substantially the input voltage Vin and the inductor current IL increases.

Besides, at the time t62, the transistor 11 is turned on, thereafter, the timer portion 14 starts the counting of the on-period ton. As described above, according to the switching power supply device A in the fourth embodiment, the pre-restart of the timer portion 14 is started at the time t61 that is earlier than the time t62 when to start the counting of the on-period ton by the preparation period tpre. Therefore, it is possible to add a margin of the preparation period tpre to the restart period of the timer portion 14 compared with the first embodiment; accordingly, it becomes possible to solve the restart delay of the timer portion 14 and to prevent the overshoot of the output voltage Vout.

At the time t63, if the timer portion 14 completes the counting of the on-period ton and a trigger pulse is generated in the timer signal S2, the gate signal G1 is dropped to the low level and the gate signal G2 is raised to the high level. As a result of this, the transistor 11 is turned off and the transistor 12 is turned on. At this time, an induced electromotive force occurs in the inductor L1 to continue flowing the inductor current IL in the same direction as until now; accordingly, the inductor current IL flows from the ground terminal into the inductor L1 via the transistor 12. Therefore, the switch voltage Vsw declines to a negative voltage value that is lower than the ground voltage GND by a drop voltage across the transistor 12. In the meantime, like in the first embodiment, the timer portion 14 is turned off with no delay at the time point when the counting of the on-period ton is completed.

At a time t64, if the inductor current IL becomes lower than the zero value; a backward flow current for the transistor 12 occurs and the polarity of the switch voltage Vsw is switched from negative to positive, the zero-cross detection signal S3 is raised to the high level, and further, the skip signal S4 is raised to the high level. As a result of this, the transistor 12 is forcibly turned off. By employing such a structure, it is possible to quickly shut down the backward flow current for the transistor 12; accordingly, it becomes possible to solve the efficiency decline during the light load period. Here, according to the switching power supply device A in the fourth embodiment, it is possible to add a margin of the preparation period tpre to the restart period of the backward flow detection portion 15 compared with the first embodiment; accordingly, it becomes possible to solve the restart delay of the backward flow detection portion 15 and to quickly shut down the backward flow current for the transistor 12. In the meantime, like in the first embodiment, the backward flow detection portion 15 is turned off with no delay at the time point when the backward flow detection operation is completed.

Also after a time t65, like in the above description, the switching stop process at the time of detecting the backward flow and the on/off control of the timer portion 14 and backward flow detection portion 15 are repeated.

As described above, in the switching power supply device A according to the fourth embodiment, the reference voltage Vref is the variable value that is switched to the voltages Va and Vb in the two steps, and at the time point when the feedback voltage Vfb becomes lower than the voltage Va, first, only the restart of the timer portion 14 and backward flow detection portion 15 is performed, and further at the time point when the feedback voltage Vfb declines to become lower than the voltage Vb, the switching operation of the transistors 11 and 12 is resumed. By employing such a structure, it becomes possible to solve the restart delay of the timer portion 14 and backward flow detection portion 15 and to achieve the efficiency increase during the light load period. Besides, according to the switching power supply device A in the fourth embodiment, unlike the third embodiment, it is not necessary to dispose another startup comparator 19; accordingly, the circuit scale does not increase unnecessarily.

<Application to Television>

Figure 12:
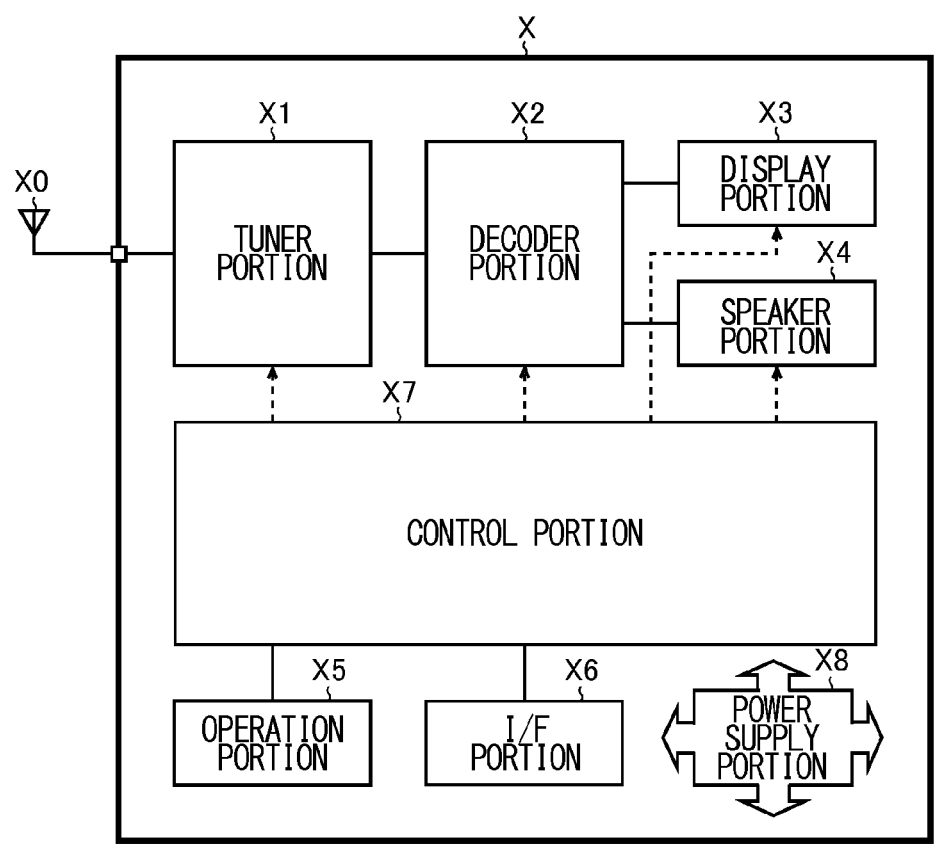
[FIG. 12] is a block diagram showing a structural example of a television that incorporates a switching power supply device A.
Figure 13A:
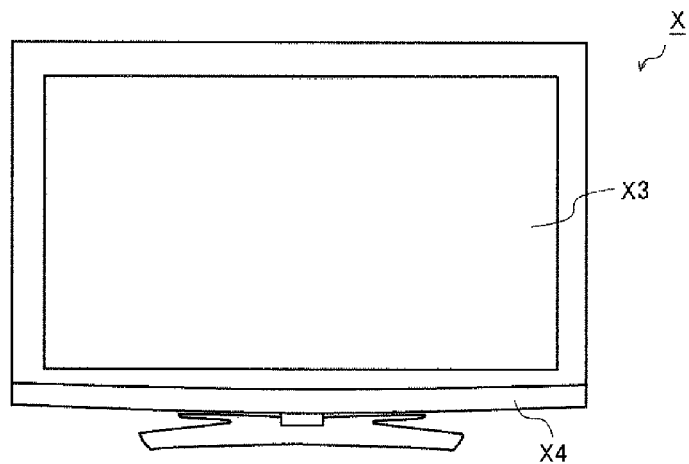
[FIG. 13A] is a front view of a television that incorporates the switching power supply device A.
Figure 13B:
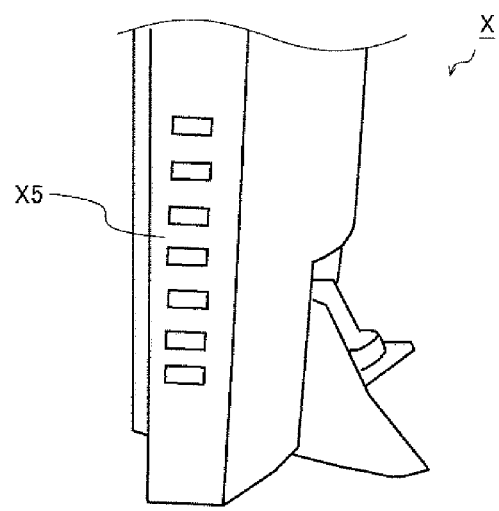
[FIG. 13B] is a side view of a television that incorporates the switching power supply device A.
Figure 13C:
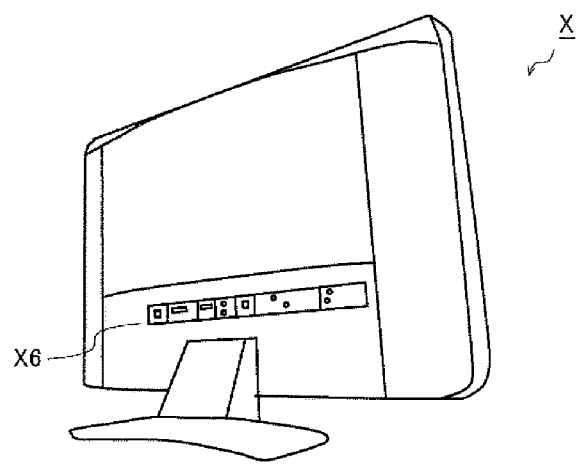
[FIG. 13C] is a rear view of a television that incorporates the switching power supply device A.
Figure 14A:
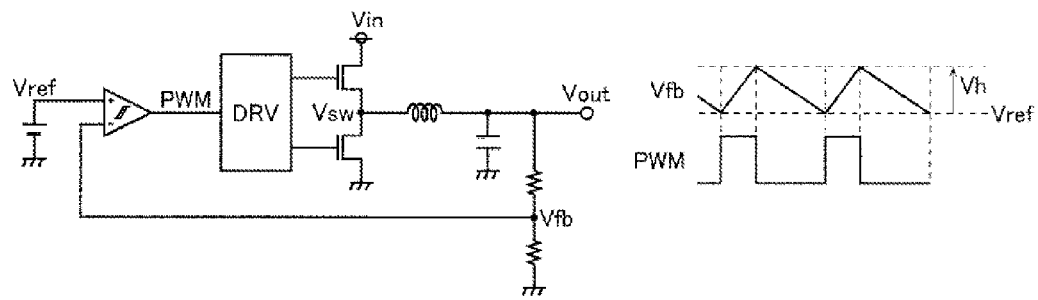
[FIG. 14A] is a circuit block diagram and operation waveform view showing a first conventional example (hysteresis window method) of a switching power supply device that employs a non-linear control method.
Figure 14B:
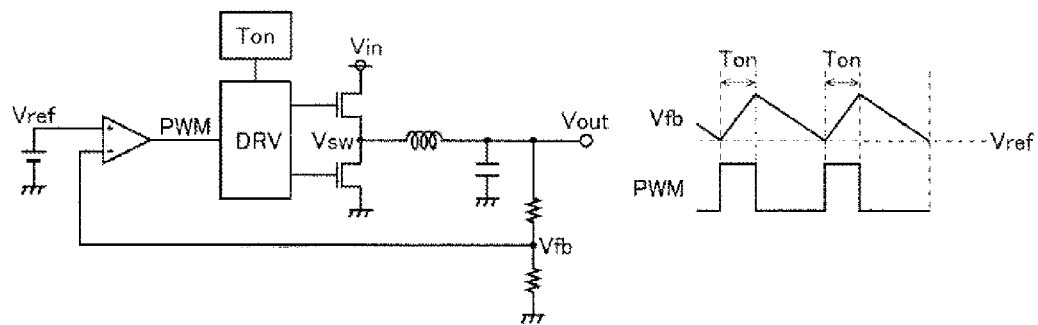
[FIG. 14B] is a circuit block diagram and operation waveform view showing a second conventional example (bottom detection on-period fixing method) of a switching power supply device that employs a non-linear control method.
Figure 14C:
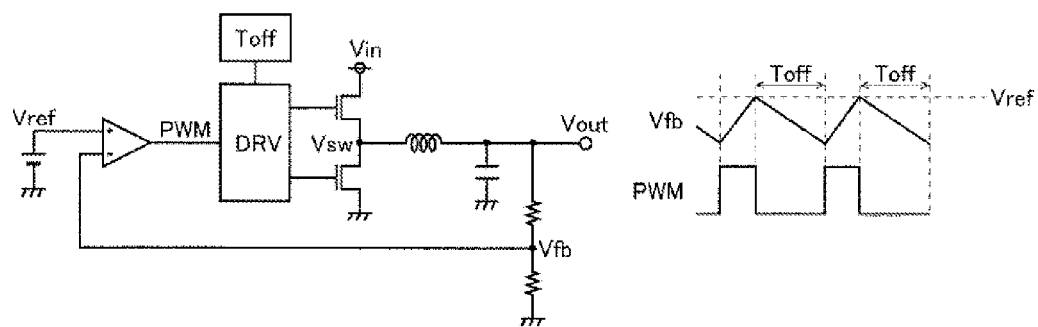
[FIG. 14C] is a circuit block diagram and operation waveform view showing a third conventional example (upper detection off-period fixing method) of a switching power supply device that employs a non-linear control method.

FIG. 12 is a block diagram showing a structural example of a television that incorporates the switching power supply device A. Besides, FIG. 13A to 13C are respectively a front view, side view, and rear view of the television that incorporates the switching power supply device A. The television X in the present structural example has: a tuner portion X1; decoder portion X2; a display portion X3; a speaker portion X4; an operation portion X5; an interface portion X6; a control portion X7; and a power supply portion X8.

The tuner portion X1 selects a broadcast signal for a desired channel from a reception signal received by an antenna X0 that is externally connected to the television X.

The decoder portion X2 generates an image signal and a voice signal from the broadcast signal selected by the tuner X1. Besides, the decoder portion X2 includes a function as well to generate an image signal and a voice signal based on an external input signal from the interface portion X6.

The display portion X3 outputs the image signal, which is generated by the decoder portion X2, as an image.

The speaker portion X4 outputs the voice signal, which is generated by the decoder portion, as a voice.

The operation portion X5 is a human interface that accepts a user operation. As the operation portion X5, it is possible to use a button, a switch, a remote controller and the like.

The interface portion X6 is a front end that accepts an external input signal from external devices (optical disc player, hard disc drive and the like).

The control portion X7 comprehensively controls the operation of each of the portions X1 to X6. As the control portion X7, it is possible to use a CPU [central processing unit] and the like.

The power supply portion X8 performs power supply to each of the portions X1 to X7. As the power supply portion X8, it is possible to preferably use the above switching power supply device A.

<Other Modifications>

Besides, the structure of the present invention is able to be modified in various ways without departing from the spirit of the present invention besides the above embodiments. For example, in the above embodiments, the switching power supply device employing the bottom detection on-period fixing system is described as an example; however, the present invention is also applicable to a switching power supply device that employs an upper detection off-period fixing system.

As described above, it should be considered that the above embodiments are examples in all respects and are not limiting, and the technological scope of the present invention is not indicated by the above description of the embodiments but by the claims, and all modifications within the scope of the claims and the meaning equivalent to the claims are covered.

INDUSTRIAL APPLICABILITY

The switching power supply device according to the present invention is preferably usable for personal computers, liquid crystal televisions, DVD recorders and the like.

LIST OF REFERENCE NUMERALS 1 semiconductor apparatus (switching power supply IC)
11 MOS field effect transistor of N channel type (output transistor)
12 MOS field effect transistor of N channel type (synchronization rectification transistor)
13 main comparator
14 timer portion
15 backward flow detection portion
150 comparator
151, 152 electric current sources
153 to 155 switches
156 resistor
157 logic portion
16 latch portion
17 switching control portion
18 delay portion
19 startup comparator
20 pulse distribution portion
L1 inductor
R1, R2 resistors
C1 capacitor
T1 to T5 external terminals
A switching power supply device
X television
X0 antenna
X1 tuner portion
X2 decoder portion
X3 display portion
X4 speaker portion
X5 operation portion
X6 interface portion
X7 control portion
X8 power supply portion

What is claimed is:
1. A switching power supply device comprising:
a switching control portion that generates an output voltage from an input voltage by performing on/off control of a switch device using a non-linear control method in accordance with a comparison signal and a timer signal;
a main comparator that compares a feedback voltage corresponding to the output voltage and a predetermined reference voltage with each other to generate the comparison signal;
a timer portion that performs a one-shot output of the timer signal at a time point when a predetermined fixed period elapses after the on/off of the switch device is switched; and
a backward flow detection portion that detects a backward flow for the switch device to forcibly turn off the switch device;
wherein the timer portion and the backward flow detection portion are turned on at a time point when a pulse edge of the comparison signal occurs and turned off at a time point when operation of each of the timer portion and backward flow detection portion is completed, the switching power supply device further comprising a delay portion that performs a one-shot output of a delay comparison signal at a time point when a predetermined delay period elapses after the pulse edge of the comparison signal occurs, wherein the switching control portion receives an input of the delay comparison signal instead of the comparison signal and performs the on/off control of the switch device using the non-linear control method in accordance with the delay comparison signal and the timer signal.

2. The switching power supply device according to claim 1, wherein the delay portion neglects the comparison signal for a predetermined mask period after performing the one-shot output of the delay comparison signal.

3. The switching power supply device according to claim 2, wherein the timer portion and the backward flow detection portion undergo on/off control when necessary in a sleep mode and are kept in a normally turned-on state in a non-sleep mode.

4. The switching power supply device according to claim 3, wherein the delay portion performs a one-shot output of the delay comparison signal in the sleep mode and performs a through-output of the comparison signal as the delay comparison signal in the non-sleep mode.

5. The switching power supply device according to claim 4, wherein the backward flow detection portion operates on a drive current larger than usual in the sleep mode and operates on a usual drive current in the non-sleep mode.

6. The switching power supply device according to claim 3, wherein the backward flow detection portion operates on a drive current larger than usual in the sleep mode and operates on a usual drive current in the non-sleep mode.

7. The switching power supply device according to claim 1, wherein the timer portion and the backward flow detection portion undergo on/off control when necessary in a sleep mode and are kept in a normally turned-on state in a non-sleep mode.

8. The switching power supply device according to claim 7, wherein the delay portion performs a one-shot output of the delay comparison signal in the sleep mode and performs a through-output of the comparison signal as the delay comparison signal in the non-sleep mode.

9. The switching power supply device according to claim 8, wherein the backward flow detection portion operates on a drive current larger than usual in the sleep mode and operates on a usual drive current in the non-sleep mode.

10. The switching power supply device according to claim 7, wherein the backward flow detection portion operates on a drive current larger than usual in the sleep mode and operates on a usual drive current in the non-sleep mode.

11. The switching power supply device according to claim 1, further comprising:
a startup comparator that compares the feedback voltage and a predetermined threshold value voltage with each other to generate a startup signal;
wherein the timer portion and the backward flow detection portion receive an input of the startup signal instead of the comparison signal and are turned on at a time point when a pulse edge of the startup signal occurs before the pulse edge of the comparison signal occurs.

12. The switching power supply device according to claim 1, further comprising:
a pulse distribution portion that distributes two pulses, which occur in the comparison signal thanks to variable control of the reference voltage, to a first comparison signal and a second comparison signal;
wherein the timer portion and the backward flow detection portion receive an input of the first comparison signal instead of the comparison signal and are turned on at a time point when a pulse edge of the first comparison signal occurs before a pulse edge of the second comparison signal occurs; and
the switching control portion receives an input of the second comparison signal instead of the comparison signal and performs the on/off control of the switch device using the non-linear control method in accordance with the second comparison signal and the timer signal.

13. The switching power supply device according to claim 1, wherein the switch device is connected between a terminal of an inductor and an application terminal for a ground voltage;
and during an on-period of the switch device, the backward flow detection portion compares a switch voltage appearing at a terminal of the switch device and the ground voltage with each other to generate a zero-cross detection signal.

14. The switching power supply device according to claim 13, further comprising:
a latch portion that generates a skip signal which is set to a first logic level at a pulse edge of the zero-cross detection signal and reset to a second logic level at the pulse edge of the comparison signal;
wherein the switching control portion forcibly turns off the switch device during a period when the skip signal is kept at the first logic level.

15. A television comprising:
a tuner portion that selects a broadcast signal for a desired channel from a reception signal;
a decoder portion that generates an image signal and a voice signal from the broadcast signal selected by the tuner portion;
a display portion that outputs the image signal as an image;
a speaker portion that outputs the voice signal as a voice;
an operation portion that receives a user operation;
an interface portion that receives an external input signal;
a control portion that controls comprehensively operation of each of the portions; and
a power supply portion that supplies electric power to each of the portions;
wherein the power supply portion includes the switching power supply device according to claim 1.

16. A switching power supply device comprising:
a switching control portion that generates an output voltage from an input voltage by performing on/off control of a switch device using a non-linear control method in accordance with a comparison signal and a timer signal;
a main comparator that compares a feedback voltage corresponding to the output voltage and a predetermined reference voltage with each other to generate the comparison signal;
a timer portion that performs a one-shot output of the timer signal at a time point when a predetermined fixed period elapses after the on/off of the switch device is switched; and
a backward flow detection portion that detects a backward flow for the switch device to forcibly turn off the switch device;
wherein the timer portion and the backward flow detection portion are turned on at a time point when a pulse edge of the comparison signal occurs and turned off at a time point when operation of each of the timer portion and backward flow detection portion is completed, the switching power supply device further comprising a startup comparator that compares the feedback voltage and a predetermined threshold value voltage with each other to generate a startup signal, wherein the timer portion and the backward flow detection portion receive an input of the startup signal instead of the comparison signal and are turned on at a time point when a pulse edge of the startup signal occurs before the pulse edge of the comparison signal occurs.

17. A television comprising:
a tuner portion that selects a broadcast signal for a desired channel from a reception signal;
a decoder portion that generates an image signal and a voice signal from the broadcast signal selected by the tuner portion;
a display portion that outputs the image signal as an image;
a speaker portion that outputs the voice signal as a voice;
an operation portion that receives a user operation;
an interface portion that receives an external input signal;
a control portion that controls comprehensively operation of each of the portions; and
a power supply portion that supplies electric power to each of the portions;
wherein the power supply portion includes the switching power supply device according to claim 16.

18. A switching power supply device comprising:
a switching control portion that generates an output voltage from an input voltage by performing on/off control of a switch device using a non-linear control method in accordance with a comparison signal and a timer signal, wherein the switch device is connected between a terminal of an inductor and an application terminal for a ground voltage;
a main comparator that compares a feedback voltage corresponding to the output voltage and a predetermined reference voltage with each other to generate the comparison signal;
a timer portion that performs a one-shot output of the timer signal at a time point when a predetermined fixed period elapses after the on/off of the switch device is switched; and
a backward flow detection portion that detects a backward flow for the switch device to forcibly turn off the switch device;
wherein the timer portion and the backward flow detection portion are turned on at a time point when a pulse edge of the comparison signal occurs and turned off at a time point when operation of each of the timer portion and backward flow detection portion is completed, and
wherein, during an on-period of the switch device, the backward flow detection portion compares a switch voltage appearing at a terminal of the switch device and the ground voltage with each other to generate a zero-cross detection signal.

19. A television comprising:
a tuner portion that selects a broadcast signal for a desired channel from a reception signal;
a decoder portion that generates an image signal and a voice signal from the broadcast signal selected by the tuner portion;
a display portion that outputs the image signal as an image;
a speaker portion that outputs the voice signal as a voice;
an operation portion that receives a user operation;
an interface portion that receives an external input signal;
a control portion that controls comprehensively operation of each of the portions; and
a power supply portion that supplies electric power to each of the portions;
wherein the power supply portion includes the switching power supply device according to claim 18.

* * * * *